United States Patent
Owechko et al.

(10) Patent No.: US 7,672,911 B2
(45) Date of Patent: Mar. 2, 2010

(54) GRAPH-BASED COGNITIVE SWARMS FOR OBJECT GROUP RECOGNITION IN A 3N OR GREATER-DIMENSIONAL SOLUTION SPACE

(75) Inventors: Yuri Owechko, Newbury Park, CA (US); Swarup Medasani, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 425 days.

(21) Appl. No.: 11/433,159

(22) Filed: May 12, 2006

(65) Prior Publication Data
US 2007/0183670 A1    Aug. 9, 2007

Related U.S. Application Data

(63) Continuation-in-part of application No. 10/918,336, filed on Aug. 14, 2004.

(51) Int. Cl.
G06K 9/00 (2006.01)
G06K 9/62 (2006.01)
G06F 15/18 (2006.01)

(52) U.S. Cl. .................... 706/14; 382/100; 382/224
(58) Field of Classification Search .............. 706/14
See application file for complete search history.

(56) References Cited

OTHER PUBLICATIONS

Rajinda Senaratne, and Saman Halgamuge. "Using Particle Swarm Optimisation for Elastic Bunch Graph Matching to Recognise Faces" Mechatronics Research Group The University of Melbourne, Australia. Nov. 2005.*

Swarup Medasani, Raghu Krishnapuram, and Youngsik Choi. "Graph Matching by Relaxation of Fuzzy Assignments" IEEE Transactions on Fuzzy Systems, vol. 9, No. 1, Feb. 2001.*

James Kennedy and Russell Eberhart "Particle Swarm Optimization" Purdue School of Engineering and Technology. IEEE 1995.*

B. Bhanu, et al., "Adaptive Image Segmentation Using a Genetic Algorithm," IEEE Transactions on Systems, Man, and Cybernetics, vol. 25, No. 12, Dec. 1995.

V. Ciesielski and M. Zhang, Using Genetic Algorithms to Improve the Accuracy of Object Detection, In Proceedings of the third Pacific-Asia Knowledge Discovery and Data Mining Conference, Ning Zhong and Lizhu Zhou (Eds.), Knowledge Discovery and Data Mining—Research and Practical Experiences. Tsinghua University Press, p. 19-24. Beijing, China, Apr. 26-31, 1999.

(Continued)

Primary Examiner—David R Vincent
Assistant Examiner—Ben M Rifkin
(74) Attorney, Agent, or Firm—Tope-McKay & Assoc.

(57) ABSTRACT

An object recognition system is described that incorporates swarming classifiers. The swarming classifiers comprise a plurality of software agents configured to operate as a cooperative swarm to classify an object group in a domain. Each node N represents an object in the group having K object attributes. Each agent is assigned an initial velocity vector to explore a KN-dimensional solution space for solutions matching the agent's graph. Further, each agent is configured to search the solution space for an optimum solution. The agents keep track of their coordinates in the KN-dimensional solution space that are associated with an observed best solution (pbest) and a global best solution (gbest). The gbest is used to store the best solution among all agents which corresponds to a best graph among all agents. Each velocity vector thereafter changes towards pbest and gbest, allowing the cooperative swarm to classify of the object group.

36 Claims, 9 Drawing Sheets

OTHER PUBLICATIONS

Kennedy, J., Eberhart, R. C., and Shi, Y., Swarm Intelligence San Francisco: Morgan Kaufmann Publishers, 2001.

R. Brits, A. P. Engelbrecht, and F. van den Bergh, "A Niching Particle Swarm Optimizer," 2002.

D. Beasley, D. R. Bull, and R. R. Martin, "A Sequential Niching Technique for Multimodal Function Optimization," Evolutionary Computation, 1(2), p. 101-125, 1993.

R. Krishnapuram and J. M. Keller. Quantative Analysis of Properties and Spatial Relations of Fuzzy Image Regions. Transactions on Fuzzy Systems, 1(2):98-110, 1993.

D. L. Swets, B. Punch, and J. Weng, Genetics Algorithms for Object Recognition in a complex scene, Proc. of Intl. Conference on Image Processing, vol. 2, Oct. pp. 23-26, 1995.

R. C. Eberhart and Y. Shi, "Particle Swaim Optimization: Developments, Applications, and Resources," 2001.

Y. Owechko and S. Medasani, "A Swarm-based Volition/Attention Framework for Object Recognition," IEEE Conference on Computer Vision and Pattern Recognition, San Diego, Proc. Of CVPR-WAPCV 2005.

Y. Owechko and S. Medasani, "Cognitive Swarms for Rapid Detection of Objects and Associations in Visual Imagery," IEEE Swarm Intelligence Symposium, Pasadena, 2005.

P. Saisan, S. Medasani, and Y. Owechko "Multi-View Classifier Swarms for Pedestrian Detection and Tracking," IEEE Conference on Computer Vision and Pattern Recognition, San Diego, 2005.

N. Srinivasa, et al., "Fuzzy edge-symmetry features for enhanced intruder detection," 11th International Conference on Fuzzy Systems, FUZZIEEE 2003.

F. Orabona, G. Metta, and G. Sandini, "Object-based Visual Attention: A Model for a Behaving Robot," in 3rd International Workshop on Attention and Performance in Computational Vision (in CVPR 2005), San Diego, CA, Jun. 2005.

B. J. Scholl, "Objects and Attention: The State of the Art," Cognition 80: 1-46, 2001.

Y. Sun and R. Fisher, "Hierarchical Selectivity for Object-based Visual Attention," submitted to Artificial Intelligence, 2004.

Liao, Wenhul and Ji, Qiang 2006, "Efficient Active Fusion for Decision-making via VOI Approximation," in Proc. AAAI 2006, 1180-1185.

Jaynes, C., Stolle, F., and Collins, R., "Task Driven Perceptual Organization for Extraction of Roofop Polygons," Proceedings of the ARPA Image Understanding Workshop, Monterey, California (Morgan Kaufmann Publishers, San Francisco, 1994), pp. 359-365.

A. Huertas, and R. Nevatia, "Detecting Changes in Aerial Views of Man-Made Structures," IVC200, 2000.

R. Mendes, "The Fully Informed Particle Swarm: Simpler, Maybe Better," Special issue of IEEE Trans. On Evol. Computation on Particle Swarm Optimization, vol. 8, No. 3, Jun. 2004.

K.E. Parsopoulos, et al. "On the Computation of All Global Minimizers Through Particle Swarm Optimization," Special issue of IEEE Trans. On Evol. Computation on Particle Swarm Optimization, vol. 8, No. 3, Jun. 2004.

F. van der Bergh, et al., "A Cooperative Approach to Particle Swarm Optimization," Special issue of IEEE Trans. On Evol. Computation on Particle Swarm Optimization, vol. 8, No. 3, Jun. 2004.

A. Ratnaweera, "Self-Organizing hierarchical particle Swarm Optimizer with Time-Varying Acceleration Coefficients," Special issue of IEEE Trans. On Evol. Computation on Particle Swarm Optimization, vol. 8, No. 3, Jun. 2004.

C.A. Coello, "Handling Multiple Objectives With Particle Swarm Optimization," Special issue of IEEE Trans. On Evol. Computation on Particle Swarm Optimization, vol. 8, No. 3, Jun. 2004.

L. Messerschmidt, et al., "Learning to Play Games Using a PSO-Based Competitive Learning Approach," Special issue of IEEE Trans. On Evol. Computation on Particle Swarm Optimization, vol. 8, No. 3, Jun. 2004.

M.P. Wachwiak, et al., "An Approach to Multimodal Biomedical Image Registration Utilizing Particle Swarm Optimization," Special issue of IEEE Trans. On Evol. Computation on Particle Swarm Optimization, vol. 8, No. 3, Jun. 2004.

R. Hassan, B. Cohanim, and O. de Weck, "A Comparison of Particle Swarm Optimization and the Genetic Algorithm," AIAA Conference, 2005.

J.F. Schutte, J.A. Reinbolt, B.j. Fregly, R.T. Haftka, and A.D. George, "Parallel Global Optimization with the Particle Swarm Algorithm," Int. J. Numerical methods in Engineering, 61: 2296-2315, 2004.

J. Kennedy and W.M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.

Bradski, G. and S. Grossberg (1995), "Fast learning VIEWNET architectures for recognizing 3-D objects from multiple 2-D views," Neural Networks 8, 1053-1080.

Charniak, E. (1991), "Bayesian networks without tears," AI Magazine 12, 50-63.

Hu, W., D. Xie, et al. (2004), "Learning activity patterns using fuzzy self-organizing neural network," IEEE Transactions on Systems, Man, and Cybernetics—Part B: Cybernetics 34, 1618-1626.

Lazebnik, S., C. Schmid, et al. (2006), "Beyond bags of features: Spatial pyramid matching for recognizing natural scene categories," IEEE Conference on Computer Vision and Pattern Recognition, New York, NY.

Lowe, D. (1999), "Object recognition from local scale-invariant features," International Conference on Computer Vision, Corfu, Greece.

Medasani, S. and Y. Owechko (2007), "Behavior recognition using cognitive swarms and fuzzy graphs," SPIE Defense and Security Symposium, Orlando, FL.

S. Medasani, and Y. Owechko, "Possibilistic Particle Swarms for Optimization," Proceedings 5673 of SPIE/IST Symposium on Electronic Imaging, San Jose, 2005.

Park, S. and J. Aggarwal (2003), "A hierarchical Bayesian network for event recognition of human actions and interactions," ACM SIGMM International Workshop on Video Surveillance, Berkely, CA.

Barbara Zitova and Jan Flusser, "Image registration methods: a survey," Image and Vision Computing 21, pp. 977-1000, 2003.

S. Medasani and R. Krishnapuram, "Graph Matching by Relaxation of fuzzy assignments," IEEE Transactions on Fuzzy Systems, 9(1), 173-183, Feb. 2001.

R. Krishnapuram, S. Medasani, S. Jung and Y. Choi, "Content-Based Image Retrieval Based on a Fuzzy Approach," IEEE Transactions on Knowledge and Data Engineering (TKDE), Oct. 2004.

N. Oliver and A. Pentland, "Graphical models for driver behavior recognition in a smart car," Proc. Of IV2000, 2000.

K. Sato and J.K. Aggarwal, "Temporal spatio-velocity transform and its application to tracking and interaction," CVIU 96(2004), 100-128.

S. Hongeng, R. Nevatia, and F. Bremond, "Vide-based event recognition: activity representation and probabilistic recognition methods," CVIU 96(2004), 129-162.

G. Medioni, I. Cohen, F. Bremond, S. Hongeng, R. Nevatia, "Event detection and analysis from video streams," IEEE PAMI 23(8), 2001, 873-889.

N. Oliver, A. Garg, and E. Horvitz, "Layered representations for learning and inferring office activity from multiple sensory channels," CVIU 96(2004), 163-180.

A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.

R.T. Collins, A. J. Lipton, and T. Kanade, "Introduction to the special section on video surveillance," IEEE-PAMI, 22(8), Aug. 2000.

N. Oliver, B. Rosario, and A. Pentland, "A Bayesian computer vision system for moceling human interactions," IEEE-PAMI, 22(8), Aug. 2000.

Y. Owechko, S. Medasani, and N. Srinivasa, "Classifier Swarms for Human Detection in infrared imagery," Proc. Of the CVPR workshop on Object Tracking and Classification Beyond the Visible Spectrum (OTCBVS'04) 2004.

M.P. Windham, "Numerical classification of proximity data with assignment measure," Journal of Classification, vol. 2, pp. 157-172, 1985.

S. Gold and A. Rangarajan, "A graduated assignment algorithm for graph matching," IEEE Transaction on Pattern Analysis and Machine Intelligence, vol. 18, pp. 377-387, Apr. 1996.

J.C. Bezdek, Pattern Recognition with Fuzzy Objective Function Algorithms, Plenum Press, New York, 1981.

Z. Zhang, "A flexible new technique for camera calibration," IEEE Transactions on Pattern Analysis and Machine Intelligence, 22(11): 1330-1334, 2000.

Jean-Yves Bouguet, "Camera Calibration Toolbox for Matlab," http://www.vision.caltech.edu/bouguetj/calib_doc/.

Intel OpenCV Computer Vision Library (C++), http://www.intel.com/research/mrl/research/opencv/.

Giorgio Carpaneto, Paolo Toth, "Algorithm 548: Solution of the assignment problem [H]," ACM Transactions on Mathematical Software, 6(1): 104-111, 1980.

I. Hartley, A. Zisserman, "Multiple view geometry in computer vision," Cambridge University Press, Cambridge, UK 2000.

Longuet-Higgins, "A computer algorithm for reconstructing a scene from two projections" Nature, 293: 133-135, Sep. 1981.

T. Kailath, et al., "Linear Estimation," Prentice Hall, NJ, ISBN 0-13-022464-2, 854pp, 2000.

P. Saisan, "Modeling Human Motion for recognition," IS&T/SPIE 17th annual symposium, San Jose, CA 2005.

A.R. Dick, et al., "Combining Single view recognition and multiple view stereo for architectural scenes," International Conference on Computer Vision (ICCV'01) vol. 1, Jul. 7-14, 2001, Vancouver, B.C., Canada.

G. Shakhanarovich, et al. "Integrated face and gait recognition from multiple views," In Proceedings of the IEEE Conference on Computer Vision and Pattern Recognition, Dec. 2001, Kauai, Hawaii.

Sujit Kuthirummal, et al., "Planar shape recognition across multiple views," In Proceedings of the Interationa Conference on Pattern Recognition (ICPR)—2002, Quebec, Canada.

Sujit Kuthirummal, et al., "Multiview constraints for recognition of planar curves in fourier domain," Proceedings of the Indian Conference on Vision Graphics and Image Processing (ICVGIP)—2002.

A. Selinger and R.C. Nelson, "Appearance-based object recognition using multiple views," In Proceedings of the IEEE Conference on Computer Vision and Pattern Recognition—Dec. 2001, Kauai, Hawaii.

F. Rojas, I. Rojas, R. M. Clemente, and C.G. Puntoner, "Nonlinear blind source separation using genetic algorithms," in Proceedings of International Conference on Independent Component Analysis, 2001.

Y. Owechko, et al., "Vision-Based occupant sensing and recognition for intelligent airbag systems," submitted to IEEE Trans. On Intelligent Transportation Systems, 2003.

* cited by examiner

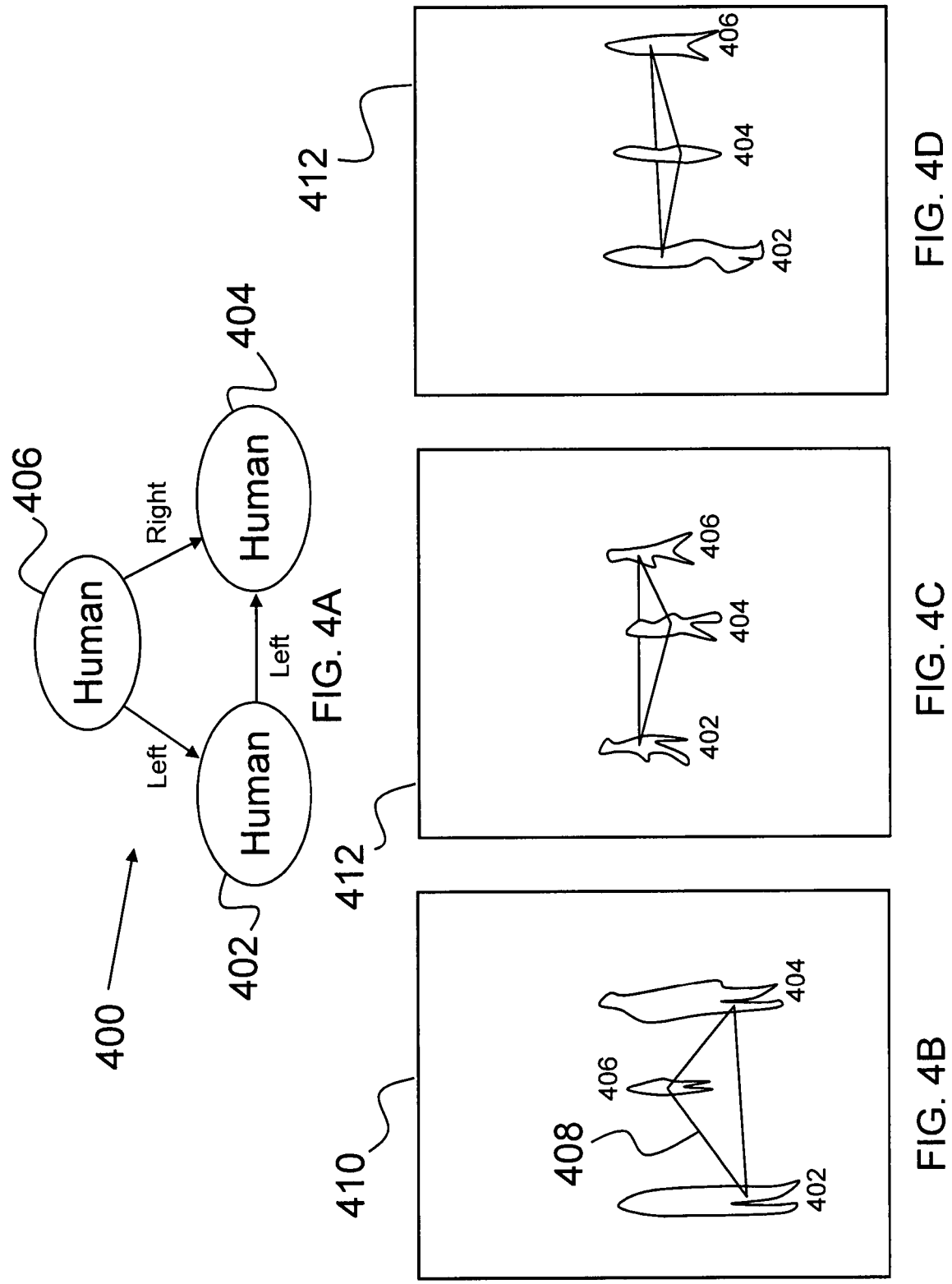

GRAPH-BASED COGNITIVE SWARMS FOR OBJECT GROUP RECOGNITION IN A 3N OR GREATER-DIMENSIONAL SOLUTION SPACE

PRIORITY CLAIM

This patent application is a Continuation-in-Part application, claiming the benefit of priority of U.S. Non-Provisional patent application Ser. No. 10/918,336, filed on Aug. 14, 2004, entitled, "Object Recognition System Incorporating Swarming Domain Classifiers."

BACKGROUND OF INVENTION (1) Field of Invention

The present invention relates to an object group recognition and tracking system, and more particularly, to a object recognition and tracking system that utilizes graph-matching to identify and track groups of objects.

(2) Related Art

Typical approaches to graph matching include different tree search algorithms such as sequential tree searches and branch and bound searches. Such techniques are described by L. Shapiro and R. M. Haralick, in "Structural description and inexact matching," IEEE PAMI 3(5), 504-519, 1981, and by W. H. Tsai and K. S. Fu, in "Error-correcting isomorphism of attributed relational graphs for pattern analysis," IEEE MSC, 9, 757-768, 1979.

Other approaches define an objective function and solve a continuous optimization problem to find the global minima. Such techniques were described by 3. S. Gold and A. Rangarajan, in "A graduated assignment algorithm for graph matching," IEEE PAMI, 18, 309-319, April 1996, and by S. Medasani and R. Krishnapuram, in "Graph Matching by Relaxation of Fuzzy Assignments," IEEE Transactions on Fuzzy Systems, 9(1), 173-183, February 2001.

Additionally, in a publication by A. D. J Cross, R. C. Wilson, and E. R. Hancock, entitled, "Inexact graph matching using genetic search," Pattern Recognition, 30(6), 953-970, 1997, the authors have shown that using genetic search methods for inexact matching problems outperforms conventional optimization methods such as gradient descent and simulated annealing.

Furthermore, in a publication by K. G. Khoo and P. N. Suganthan, entitled, "Structural Pattern Recognition Using Genetic Algorithms with Specialized Operators," IEEE Trans. On Systems, Man, and Cybernetics-Part B, 33(1), February 2003, the authors attempt to improve genetic algorithm (GA) based graph-matching procedures leading to more accurate mapping and faster convergence. The population solutions are represented by integer strings indicating the mapping between source and target graphs.

Graphs of various types have been widely used as representational tools in many applications such as object recognition, knowledge representation and scene description. Fuzzy attributed relational graphs (FARGs) are a powerful way to model the inherent uncertainty in several of the above domains. FARGs have been described by R. Krishnapuram, S. Medasani, S. Jung and Y. Choi, in "FIRST—A Fuzzy Information Retrieval System," *IEEE Trans. On Knowledge and Data Engineering*, October 2004, and in the article entitled, "Graph Matching by Relaxation of Fuzzy Assignments." The computational complexity of graph isomorphism is still an open question, i.e., whether it belongs to the Polynomial (P) or Nondeterministic-Polynomial (NP) class of problems. However, the problem of sub-graph isomorphism and inexact graph matching is known to be a member of the NP-complete class for which it is widely believed that only exponentially complex deterministic solutions exist.

A need exists to solve this hard combinatorial problem non-deterministically by using ideas from evolutionary systems. Most of the previous approaches use a single solution that is altered heuristically by minimizing an objective function or stochastically modifying the solution. Therefore, a need further exists to employ a population of potential solutions that interact to find the optimum solution for the particular problem at hand. The present invention solves such a need by using a population of agents that search the solution space and cooperatively find the optimum solution.

SUMMARY OF INVENTION

The present invention relates to a graph-based object group recognition system incorporating swarming domain classifiers. The system comprises a processor having a plurality of software agents. The software agents are configured to operate as a cooperative swarm to classify an object group in a domain. Each agent's position in a multi-dimensional solution space represents a graph having N-nodes. Each node N represents an object in the group having K object attributes. Further, each agent is assigned an initial velocity vector to explore a KN-dimensional solution space for solutions matching the agent's graph such that each agent has positional coordinates as it explores the KN-dimensional solution space. Additionally, each agent is configured to perform at least one iteration. The iteration is a search in the solution space for an optimum solution where each agent keeps track of its coordinates in the KN-dimensional solution space that are associated with an observed best solution (pbest) that the agent has identified, and a global best solution (gbest). The gbest is used to store the best solution among all agents which corresponds to a best graph among all agents. Each velocity vector thereafter changes towards pbest and gbest, allowing the cooperative swarm to concentrate on the vicinity of the object group and classify the object group when a classification level exceeds a preset threshold.

In another aspect, the processor is further configured to create a query graph that corresponds to a user-defined query, where the query graph has N-nodes. The processor also represents the query graph as a point in a high-dimensional space solution space. Each of the N-nodes in the query graph provides K-dimensions resulting in the KN-dimensional solution space. The processor is further configured to initialize the cooperative swarm in the KN-dimensional solution space such that each agent in the KN-dimensional solution space corresponds to an N-node graph with K degrees of freedom for each node, where each node represents an object. The N-node graph that corresponds to an agent's position represents a group of objects. Additionally, a position of the agent in the KN-dimensional solution space defines attributes in the domain of the objects in the group. The agents explore the KN-dimensional solution space and converge to a location in the KN-dimensional solution space that corresponds to the graph that best matches the query graph, thereby converging to a location that best matches the user-defined query. By converging to a location that best matches the user-defined query, the agents identify user-defined object groups.

In another aspect, the processor is further configured to calculate a fitness function value for a particular agent. The fitness function value is a graph matching score between the query graph and the graph corresponding to the particular agent.

The graphs have node attributes and edge attributes and the processor is further configured to calculate the fitness function value using a fitness function. The fitness function is a function of compatibilities between the node attributes in the graphs as well as compatibilities between the edge attributes of the graphs. Additionally, the fitness function value is equal to the sum of the compatibilities of the nodes in the query and graph corresponding to a particular agent.

In another aspect, the processor is further configured to determine the compatibility between a pair of nodes in the two graphs as a cumulative measure using the actual node compatibilities as well as the compatibilities of all incident edges and the nodes connected to the edges.

In another aspect, the cumulative measure is combined using fuzzy aggregation operators to provide a score between 0 and 1 for the fitness function.

In yet another aspect, K equals three such that the KN-dimensional solution space is a 3N-dimensional solution space with the object attributes being spatial attributes x, y, and h, such that x and y are coordinates of an object in the domain and h is the scale of the object in the domain. In this aspect, the processor is configured to represent the query graph as a point in a 3N-dimensional solution space, and initialize the cooperative swarm in the 3N-dimensional solution space such that each agent in the 3N-dimensional solution space corresponds to an N-node graph with three degrees of freedom for each node. Each node represents an object and the degrees of freedom for each node are x, y, and scale. The N-node graph that corresponds to an agent's position represents a group of objects with spatial relationships. A position of the agent in the 3N-dimensional solution space defines locations and sizes in the domain of the objects in the group. Therefore, the agents explore the 3N-dimensional solution space and converge to a location in the 3N-dimensional solution space that corresponds to the graph that best matches the query graph.

Finally, as can be appreciated by one in the art, the present invention also includes a method and computer program product for causing a computer to carrying out the operations of the invention described herein.

BRIEF DESCRIPTION OF THE DRAWINGS

The objects, features, and advantages of the present invention will be apparent from the following detailed descriptions of the various aspects of the invention in conjunction with reference to the following drawings, where:

FIG. 4A is an illustration of a query graph modeling an object group where people are to the "Left" and "Right" of a reference person;

FIG. 4B is an illustration of the query graph being overlaid on an original image;

FIG. 4C is an illustration of an exemplary scene where objects in the scene do not precisely satisfy the query graph constraints;

FIG. 4D is an illustration of another exemplary scene where objects in the scene do not precisely satisfy the query graph constraints;

DETAILED DESCRIPTION

Figure 1:
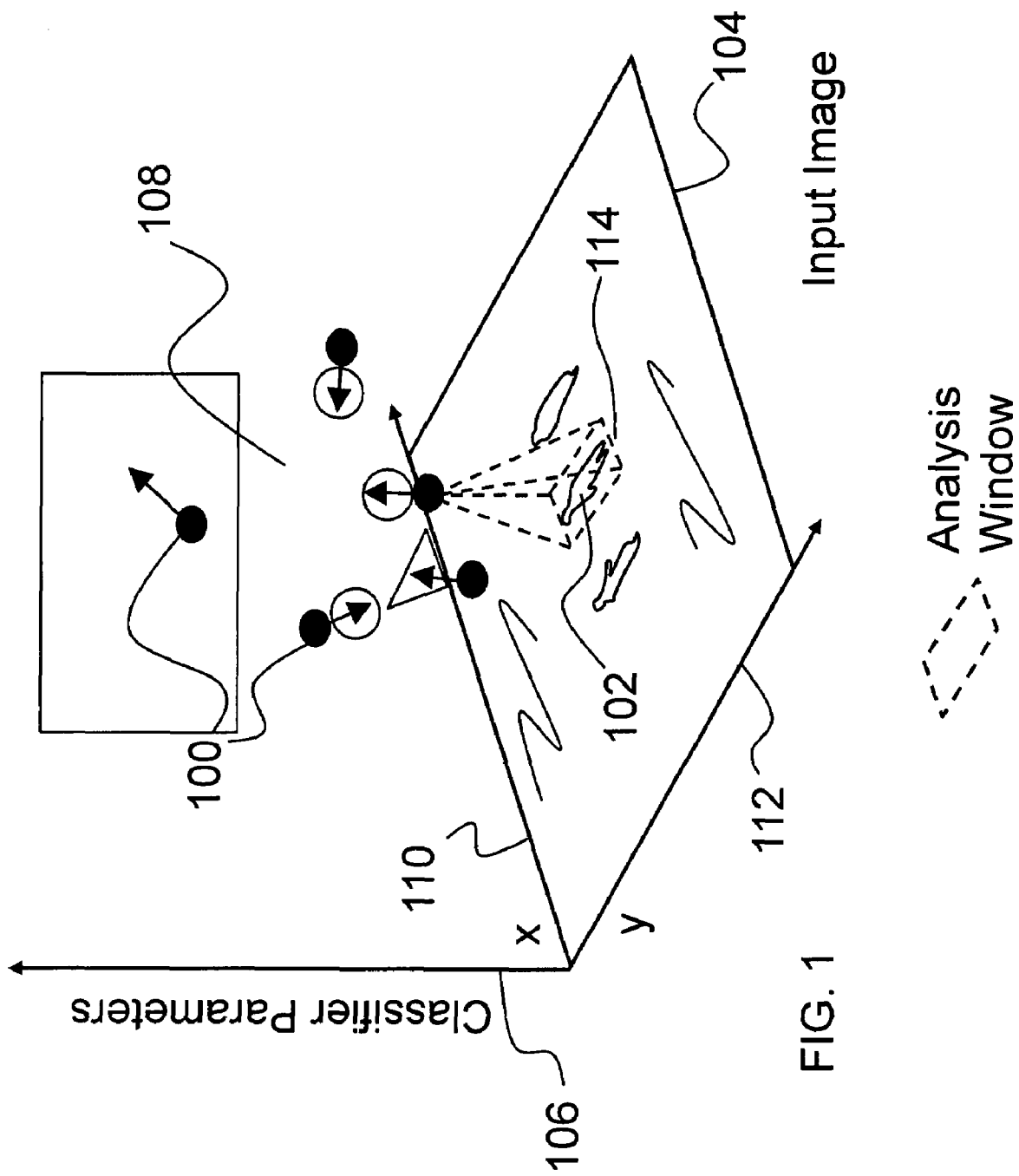
FIG. 1 is an illustration of an exemplary object recognition using a cognitive swarm of classifier agents.

The present invention relates to an object group recognition and tracking system, and more particularly, to an object recognition and tracking system that utilizes graph-matching to identify and track groups of objects. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. Additionally, the process for object recognition using swarming image classifiers draws material from the process shown and described in U.S. patent application Ser. No. 10/918,336, the entire disclosure of which is incorporated herein by reference as though fully set forth herein. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is presented. Next, a description of various principal aspects of the present invention is provided. Third, an introduction is provided to give the reader a general understanding of the present invention. Finally, details of the invention are provided to give an understanding of the specific details.

(1) Glossary

Before describing the specific details of the present invention, a glossary is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more accurately explaining the terms used.

Domain—The term "domain" refers to any searchable space having dimensions such as spatial coordinates, scale, frequency, time, Doppler shift, time delay, wave length, and phase. Domain is often attributed to an image having an object group in the image with spatial coordinates and scale.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e., computer operations coded into a computer chip). The "instruction means" may be stored in the memory of a computer or on a computer-readable medium such as a floppy disk, a CD-ROM, and a flash drive.

Large Core—The term "large core" refers to a relatively large volume in the solution space in which all points have classification confidence values above a given threshold. Objects of interest tend to generate large cores.

Particle—The term "particle" refers to self-contained agents that are graphs having n nodes and that are used to cooperate with other agents in finding objects in the scene. The terms "agents" and "particles" are used interchangeably herein. It should not be confused with particle filters which are completely different and are used for estimating probability distributions for tracking applications.

PSO—The term "PSO" refers to a particle swarm optimization (PSO) algorithm that searches a multi-dimensional solution space using a population of software agents (i.e., particles) in which each agent has its own velocity vector. The success of each agent in finding good solutions has an influence on the dynamics of other members of the swarm.

Sequential Niching—The term "sequential niching" refers to a method for searching a domain, where once the software agents identify and classify an object in the domain, the object is erased from the domain so that the swarm can continue searching the domain for additional objects without being distracted by the previously identified object.

Small Core—The term "small core" refers to a relatively small volume in the solution space in which all points have classification confidence values above a given threshold. Non-object false alarms tend to generate small cores.

Software Agent—The term "software agent" refers to a self-contained computer program that operates autonomously, although its behavior may be affected by the actions of other agents. The term "software agent" or simply "agent" is also to be used interchangeably with the word "particle."

Window—The term "window" refers to an analysis window determined by each agent's location in the image spatial coordinates and scale coordinates. The analysis window is the image region processed by the agent to determine if an object is located there.

(2) Principal Aspects

The present invention has three "principal" aspects. The first is an object recognition system using swarming domain classifiers, typically in the form of software and/or manual operations, operated using a data processing system (e.g., computer). When in the form of software, it is typically in the form of software modules configured to perform the operations described herein. The second principal aspect is a method for object recognition, the method operating using a computer system. The third principal aspect is a computer program product. The computer program product generally represents computer-readable instructions (e.g., source or object code) stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read only memory (ROM), and flash-type memories. These aspects will be described in more detail below.

(3) Introduction

The present invention is a graph-based cognitive swarm for object recognition. A related application, U.S. patent application Ser. No. 10/918,336, entitled, "Object Recognition System Incorporating Swarming Domain Classifiers," describes a method using "cognitive swarms" for visual recognition of objects in an image. The cognitive swarms combine feature-based object classification with efficient search mechanisms based on swarm intelligence. Cognitive swarms comprise groups of object classifier agents that both cooperate and compete to find objects, such as humans or vehicles, in video data using particle swarm optimization (PSO). As described in the previous application, a single large swarm detects and recognizes objects in images very efficiently.

The present invention expands on the cognitive swarm idea by adding a framework for detecting structured objects and groups in images or video using graphical swarms. The approach combines swarm optimization methods, fuzzy sets, and graph theory. Fuzzy graphs are used to represent the relational structure that needs to be detected (e.g., people next to a guard tower), with the structure being used as a model graph. The next task involves finding a graph structure in the image that matches the model graph. In the present invention, fuzzy graph models representing groups of objects with various attributes in the visual imagery domain are mapped to a higher dimensional space wherein each graph is represented as a particle. Particle swarm optimization methods are then applied in this space. On convergence, the resulting global best particle is mapped back to the graph model that best matches the image.

Use of the present invention, when dealing with images, maps graphs from the image domain into a higher dimensional space where the particle swarm optimization methods are used to solve a graph matching problem. Also the use of Fuzzy Attributed Relational Graphs (FARGs) provides the ability to model uncertainty in an elegant and robust manner.

The present invention can be used in a wide array of devices for a variety of applications. For example, the present invention can be used to improve performance and add capabilities to a wide variety of automotive, defense, and commercial vision systems with applications in the broad areas of automotive safety (backup warning and precrash sensing), factory automation, surveillance, force protection, and automatic target recognition.

(4) Details of the Invention

To provide the reader with a clear understanding of the present invention, a summary is provided of the cognitive swarm for object recognition that was described in the previous application, U.S. patent application Ser. No. 10/918,336. Next described is the graph-based cognitive swarm for object group recognition according to the present invention.

(4.1) Cognitive Swarm Method for Object Recognition

The Applicants of the present invention previously filed U.S. patent application Ser. No. 10/918,336, entitled, "Object Recognition System Incorporating Swarming Domain Classifiers." application Ser. No. 10/918,336 is incorporated by reference as though fully set forth herein. The application describes the use of cognitive swarms for object recognition. Cognitive swarms combine feature-based object classification with efficient search mechanisms based on particle swarm optimization (PSO). Objects in a visual scene need to be located and classified so they can be tracked effectively for automotive safety, surveillance, perimeter protection, and a variety of other government, and commercial applications.

Typically, classification of objects in an image is performed using features extracted from an analysis window which is scanned across the image. This brute force search can be very computationally intensive, especially if a small window is used since a classification must be performed at each window position. Conventional approaches to reducing the computational load are based on reducing the search space by using another sensor, such as scanning radar to cue the vision system and measure the range of the object. Limitations of the radar approach include high cost, false alarms, the need to associate radar tracks with visual objects, and overall system complexity. Alternatively, previous vision-only approaches have utilized motion-based segmentation using background estimation methods to reduce the search space by generating areas of interest (AOI) around moving objects and/or using stereo vision to estimate range in order to reduce searching in scale.

This approach utilizes the particle swarm optimization algorithm, a population-based evolutionary algorithm, which is effective for optimization of a wide range of functions. The algorithm models the exploration of multi-dimensional solution space by a population of individuals where the success of each individual has an influence on the dynamics of other members of the swarm. One of the aspects of this approach is that two of the dimensions are used to locate objects in the image, while the rest of the dimensions are used to optimize the classifier and analysis window parameters.

PSO is a relatively simple optimization method that has its roots in artificial life in general, and to bird flocking and swarming theory in particular. It was first described by J. Kennedy and R. Eberhart, in "Particle Swarm Optimization," IEEE Inter. Conference on Neural Networks, 1995. Conceptually, it includes aspects of genetic algorithms and evolutionary programming. Each potential solution is assigned a randomized velocity vector and the potential solutions called "particles" then "fly" through the space in search of the function optima (these particles should not be confused with particle filters, which estimate probability distributions for tracking and localization applications). The particles are self-contained agents that classify local image windows as belonging to one of a set of classes.

The coordinates of each particle in a multi-dimensional parameter space represents a potential solution. Each particle keeps track of its coordinates that are associated with the best solution (pbest) it has observed so far. A global best parameter (gbest) is used to store the best location among all particles. The velocity of each particle is then changed towards pbest and gbest in a probabilistic way according to the following update equations:

$$v^i(t) = wv^i(t-1) + c_1 * rand(\ ) * (pbest - x^i(t-1)) + c_2 * rand(\ ) * (gbest - x^i(t-1))$$

$$x^i(t) = x^i(t-1) + v^i(t),$$

where $x^i(t)$ and $v^i(t)$ are the position and velocity vectors at time t of the i-th particle and $c_1$ and $c_2$ are parameters that weight the influence of their respective terms in the velocity update equation, and * denotes multiplication. w is a decay constant which allows the swarm to converge to a solution more quickly. The rand( ) function generates a random number between 0 and 1 with a uniform distribution.

The above dynamics reflect a socio-psychological model where individual particles change their beliefs in accordance with a combination of their own experience and the best experience of the group (this is in contrast to other models of cognition where an individual changes his/her beliefs to become more consistent with his/her own experience only). The random element introduces a source of noise which enables an initial random search of the solution space. The search then becomes more directed after a few iterations as the swarm starts to concentrate on more favorable regions.

This type of search is much more efficient than a brute force search or gradient-based search methods. It is similar to genetic algorithms in that it can be used for discontinuous and noisy solution spaces since it only requires an evaluation of the function to be optimized at each particle position, with no gradient information being used. Unlike the chromosome string representation of potential solutions used in genetic algorithms, the PSO particles do not undergo cross-over or mutation operations, they just travel to a different position, calculate the solution at that position, and compare it with their own and global previous best positions in order to update their velocity vectors.

The evolution of a good solution is stable in PSO because of the way solutions are represented (e.g., small changes in the representation results in small changes in the solution, which result in improved convergence properties compared to genetic algorithms). PSO relies on the fact that in most practical problems, the optimum solution usually has better than average solutions (i.e., good solutions) residing in a volume around it. These good solutions tend to attract the particles to the region where the optimum lies. The swarm becomes more and more concentrated until the optimum is found (e.g., gbest no longer changes). PSO has been applied to a wide variety of optimization problems.

It has been found experimentally that the number of particles and iterations required scale weakly with the dimensionality of the solution space. The total number of function evaluations is very small compared to the size of the solution space, as was shown in the previous patent application. Although basic PSO only searches for a single optimum in the solution space, various approaches have been described for finding multiple local optima or "niches."

The basic cognitive swarm concept described in the previous application is shown in FIG. 1. As shown in FIG. 1, a swarm of classifier agents 100 (i.e., PSO particles), each of which is a self-contained image classifier, searches for objects 102 in a combined image 104/classifier parameter 106 solution space 108. Additionally, each agent 100 both competes and cooperates with other agents 100 using simple dynamics to find objects 102 in the scene by optimizing the classifier outputs. Furthermore, analysis and experimental results show that cognitive swarms can both improve the detection/false alarm operating point and improve update rates by orders of magnitude over conventional search methods.

The objective is to find multiple instances of an object class in an input image 104. The PSO particles 100 move in a solution space 108 where two of the dimensions represent the x coordinate 110 and the y coordinate 112 in the input image 104. The key concept in this approach is that each particle 100 in the PSO swarm is a self-contained object classifier which outputs a value representing the classification confidence that the image distribution in the analysis window 114 associated with that particle 100 is or is not a member of the object class. All particles 100 implement the same classifier, only the classifier parameters 106 vary as the particle 100 visits different positions in the solution space 108.

Two of the solution space dimensions represent the location of the analysis window 114 on the input image 104. A third dimension represents the size or scale of the analysis window 114 in order to match the unknown size of objects 102 in the image 104. Additional dimensions can be used to represent other classifier parameters such as, for example, the rotation angle of the object 102. This method differs from other vision algorithms which use swarm intelligence in that the other methods use swarms to build object models using ant colony pheromone-based ideas.

In this method, swarming occurs at the classifier level in a space consisting of object location, scale, and other classifier parameter dimensions, where each particle 100 is a complete classifier. The particles 100 swarm in this space 108 in order to find the local optima which correspond to objects in the image. The classifier details are not visible at the abstraction level of the swarm. One can imagine a multidimensional surface of classifier confidence (a type of saliency map) that can be generated if the classifier is scanned across the image. The classifier confidence map for an image 104 can be discontinuous and noisy, with many isolated false alarms where the classifier responds incorrectly to patterns in the image. Thus, using gradient-based methods to find objects in an image is problematic, which is why an exhaustive search is usually used. By generating classifier confidence maps for many images, it has been found experimentally that objects 102 in the scene tend to have large "cores" of high confidence values. Many false alarms tend to be isolated with small cores. Since the probability of a particle landing in or near a core is greater for a larger core, the particles 100 are attracted more to larger cores and the number of false alarms in an image is reduced using PSO compared to exhaustive searching. In an exhaustive search, all of the false alarms in an image 104 will be detected so the classifier must be biased towards very low false alarm rates in order to keep the overall false alarm rate low, which also has the side effect of reducing the detection rate.

Figure 2:
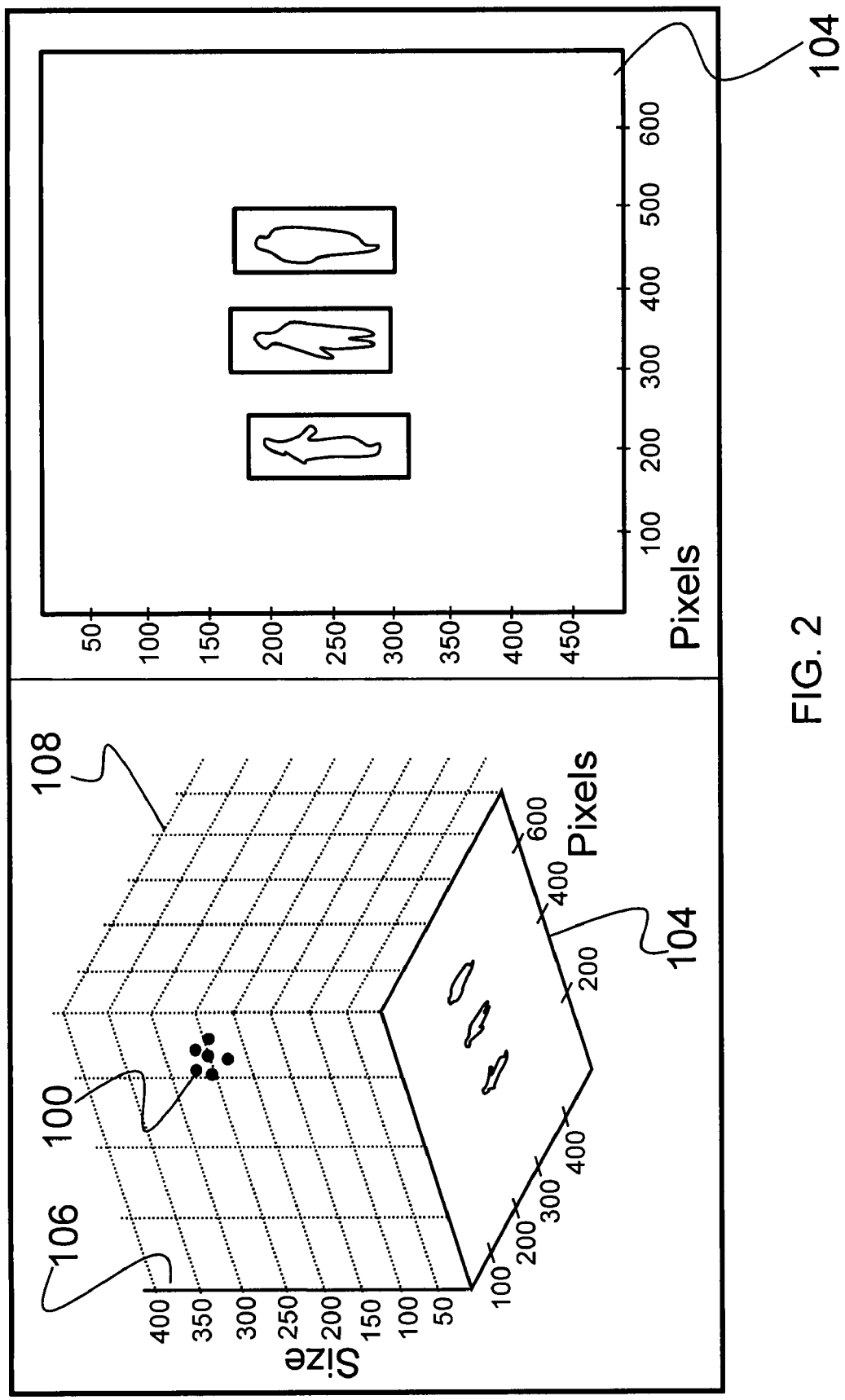
FIG. 2 is an illustration of exemplary multiple object recognition by a cognitive swarm, comprising human classifier agents using local image erasure.

In summary, the previous application described how a single large cognitive swarm can be used to recognize multiple objects in the scene through "sequential erasing" in which a detected object is erased before reinitializing the swarm to search for additional objects. The previous application also described a "probabilistic" clustering approach for detecting multiple objects. For illustrative purposes, exemplary results for detecting multiple objects using sequential erasure are shown in FIG. 2. As shown, the agents 100 are searching for actual objects in a combined image 104/classifier 106 parameter solution space 108.

(4.2) Graph-Based Cognitive Swarm

The present invention describes a novel framework to enable automatic object group recognition. Automatic object group recognition is a necessary capability of advanced computer vision systems. This task entails moving from raw pixels to high-level description of scene objects and their relationships. Such a technology would be extremely useful in several applications including visual surveillance, video stream summarization, and content-based video retrieval. Describing entity structure by its components and the spatial relations between the components is a powerful way to model and detect the desired spatial configuration of objects. The present invention uses Fuzzy Attributed Relational Graphs (FARGs) to further enhance modeling capability since they can represent complex structures and can be made invariant to affine transformations. Also, since FARGs build object representations from parts, they are more robust in cluttered environments where occlusions are often present.

First, a query graph of the object group that the user is interested in is created. Each node represents an object in the group. The graph edges or links between nodes represent spatial relationships between the objects in the group. The edges and nodes can have multiple attributes which are modeled using fuzzy labels. For example, the node attributes can be "class" which can take on fuzzy values (e.g., human, vehicle, boat, etc), "size" which can take on fuzzy values ("small," "medium," and "large"), and so on. Similarly, the edges can take on multiple attributes such as "spatial relationships," "semantic relationships," etc. The query graph is then represented as a point in a high-dimensional solution space. Each of the N nodes in the query graph provides 3 dimensions (x, y coordinates of an object in the image and h for the scale of the object), resulting in a 3N-dimensional solution space. Particle swarm optimization methods are then used wherein each particle in the 3N-dimensional solution space corresponds to an N node graph with three degrees of freedom for each node. Each node represents an object, the degrees of freedom for each node are x, y, and scale; and the graph represents a group of objects with particular spatial relationships. As can be appreciated by one skilled in the art, although described as objects, the nodes can represent sub-objects of objects in the image, where the sub-objects are parts of the objects.

The position of the particle in the 3N-dimensional solution space defines the positions and sizes of the grouped objects in the input image. The fitness value for a particle is the graph matching score between the query graph and the graph corresponding to the particular particle. The particles explore the 3N-dimensional space and converge to the location that best matches the user-defined query. This location in the 3N-dimensional solution space corresponds to the graph that best matches the query graph.

Stated in other terms, the present invention combines PSO and fuzzy graphs for rapidly locating "object groups" of interest in video imagery. To do this, the user first creates a query graph which is mapped to a KN-dimensional solution space, where N is the number of nodes and K is the number of dimensions (for the results described herein, K=three). PSO agents then rapidly explore the KN-dimensional solution space to find the matching object group. Each agent in the KN-dimensional solution space can be uniquely mapped back into the video image which is used to compute the similarity between the fuzzy graph and the graph corresponding to a particular agent. On convergence, the graph corresponding to the best matching agent would correspond to the "object group" in the video image that the user was searching for.

Figure 3:
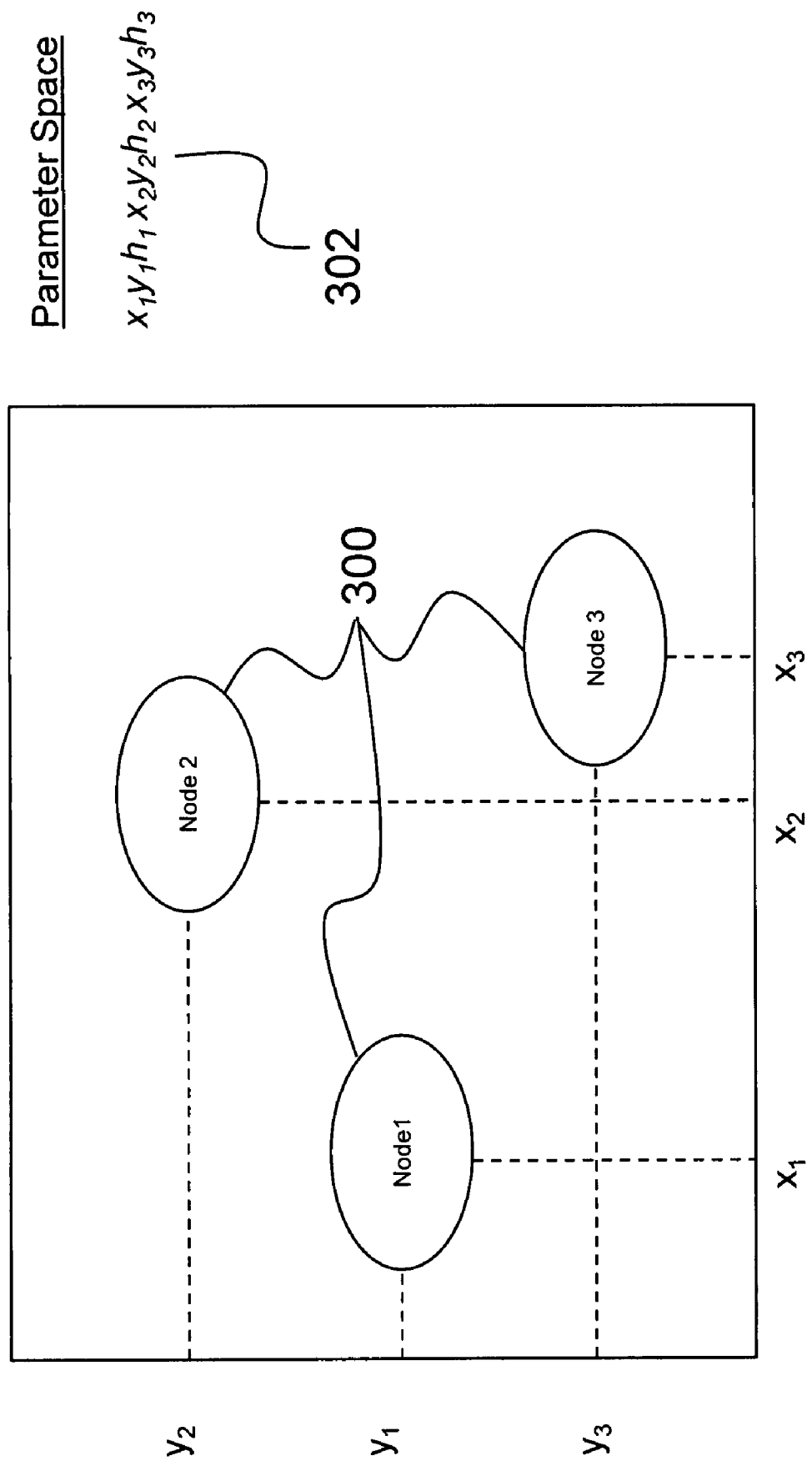
FIG. 3 is an illustration of an exemplary Fuzzy Attributed Relational Graph (FARG) and its corresponding parameter space vector.
Figure 5A:
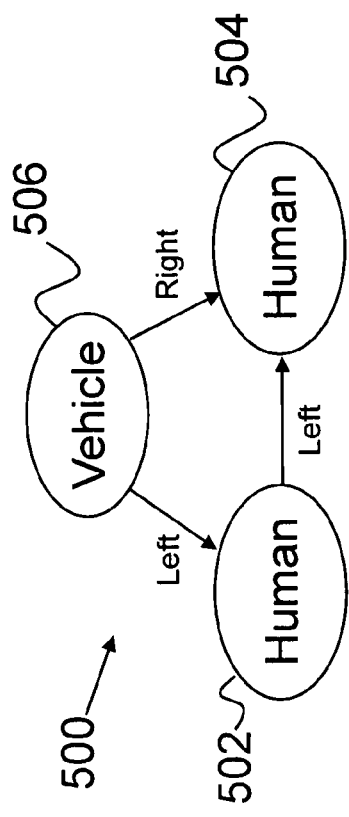
FIG. 5A is an illustration of a query graph modeling an object group where people are on either side of a vehicle.
Figure 5D:
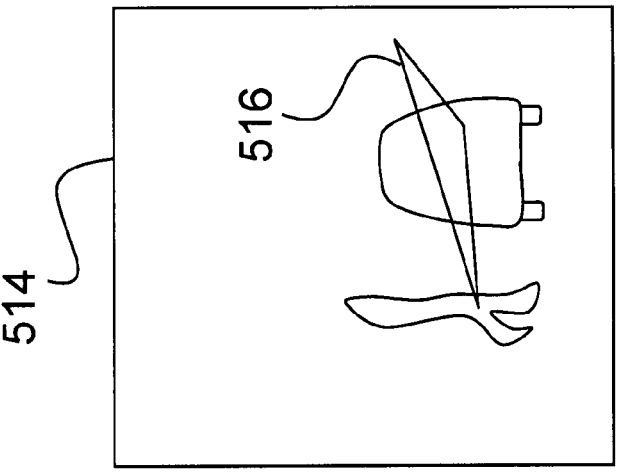
FIG. 5D is an illustration of another exemplary scene where one of the nodes in the query graph is not present in the scene.
Figure 5C:
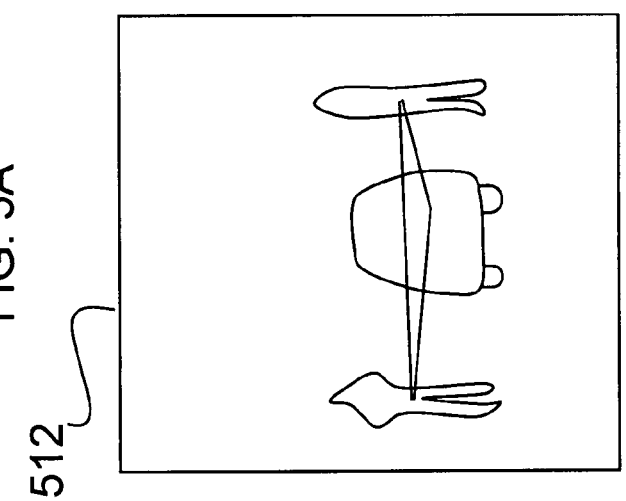
FIG. 5C is an illustration of an exemplary scene where objects in the scene do not precisely satisfy the query graph constraints.
Figure 5B:
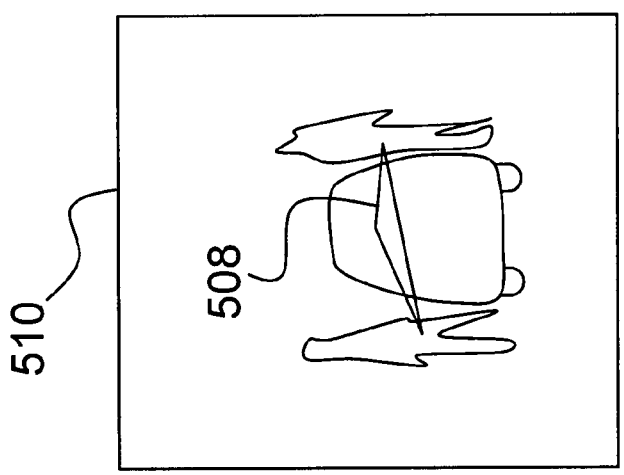
FIG. 5B is an illustration of the query graph being overlaid on an image.
Figure 6A:
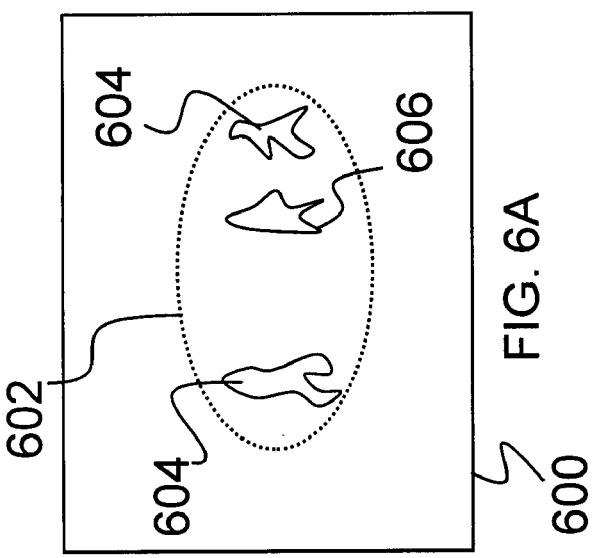
FIG. 6A is an illustration of an exemplary object group where people are on either side of a reference person.
Figure 6B:
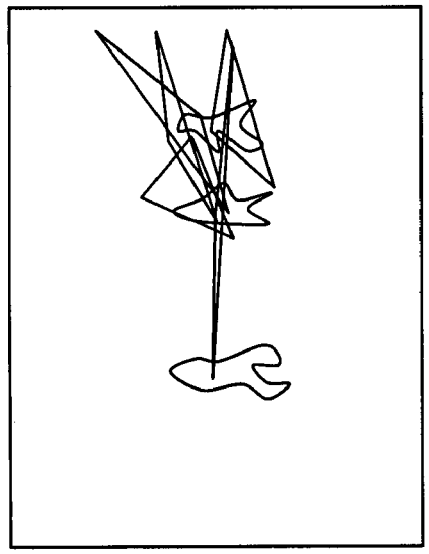
FIG. 6B is an illustration of swarm initialization to detect the object group.
Figure 6C:
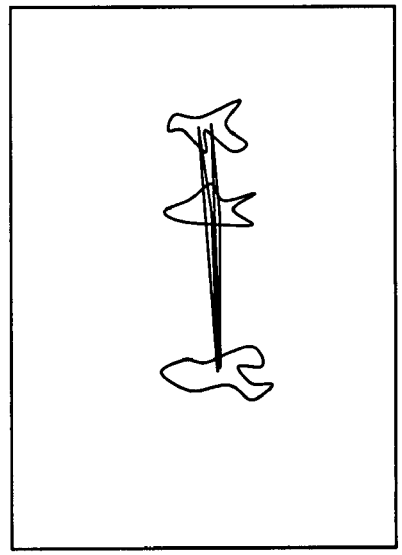
FIG. 6C is an illustration of the top five matching particles after two iterations of the particles.
Figure 6D:
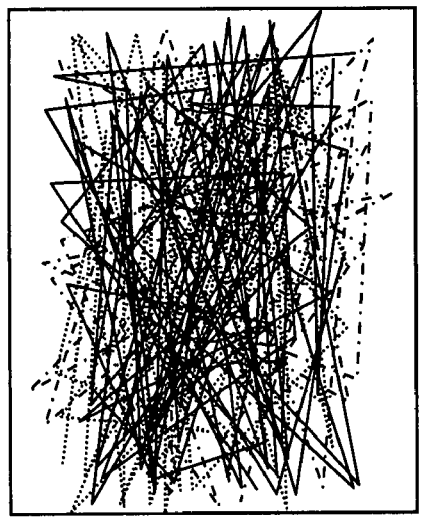
FIG. 6D is an illustration of the top five matching particles after seven iterations of the particles.
Figure 6E:
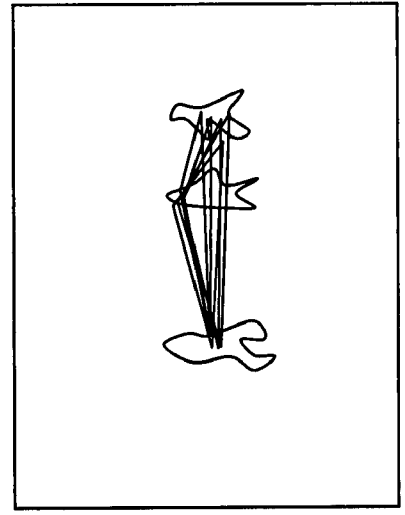
FIG. 6E is an illustration of the top five matching particles after ten iterations of the particles.
Figure 6F:
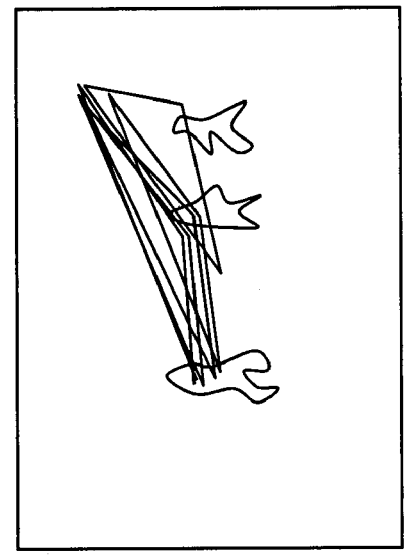
FIG. 6F is an illustration of the top five matching particles after convergence of the particles on the object group.

An example of the mapping between the PSO and graph spaces is shown in FIG. 3. FIG. 3 illustrates an exemplary FARG 300 and its corresponding parameter space vector 302. In this illustration, x, y are the image coordinates of the nodes and h is the scale of the object at that position.

The choice of the fitness function is critical to the efficiency of such approaches. The present invention modifies the fuzzy graph matching compatibility measures described in the publication entitled, "Graph Matching by Relaxation of Fuzzy Assignments." First, to reduce computational time, fixed correspondences between nodes were assumed in the test and query graphs (i.e., the first node in the query graph is assumed to always correspond to the first node in the test graph and vice-versa). The fitness function is a function of the compatibilities between the node attributes as well as the compatibilities between the edge attributes. Due to the fixed correspondence assumption, the fitness function value is equal to the sum of the compatibilities of the nodes in the two graphs. The compatibility between a pair of nodes in the two graphs is determined using the actual node compatibilities as well as the compatibilities of all the incident edges and the nodes connected to the edges. This cumulative measure is combined using fuzzy aggregation operators to provide a score between 0 and 1 for the fitness function.

Non-limiting exemplary results using this approach are presented in FIGS. 4 and 5. For all the results presented in the figures, the classifier swarm technology was used to detect object groups in the scene. In FIG. 4A, the query graph 400 was used to model a group where there is a person both to the Left 402 and Right 404 of a reference person 406. As shown in FIG. 4B, the detected structure 408 is overlaid on the original image 410. As shown in FIGS. 4C and 4D, since the models are represented using fuzzy attributed and relational graphs, scenarios can be recognized even when objects (i.e., shown as elements 402, 404, and 406) in the scene 412 do not precisely satisfy the query graph 400 constraints.

Similarly, FIG. 5 illustrates exemplary results when searching for people on either side of a vehicle. As shown in FIG. 5A, the query graph 500 is used to model a group where there is a person to both the left 502 and right 504 of a reference vehicle 506. As shown in FIG. 5B, the detected structure 508 is overlaid on the original image 510. As illustrated above and shown in FIG. 5C, scenarios can be recognized even when the objects 502 and 504 in the scene 512 do not satisfy the query graph 500 constraints exactly. As shown in FIG. 5D, since graphs are being compared, when one of the nodes in the query graph is not present in the test image 514, sub-graph isomorphism is used to find the best matching sub-graph 516.

FIGS. 6 and 7 provide additional examples of the system in actual operation. FIG. 6A illustrates an exemplary image 600 of an object group 602 where people 604 are on either side of a reference person 606. FIG. 6B illustrates the initialization of 100 particles for the graphical swarm optimization, where each particle represents a three-node FARG. Intermediate results after a few iterations are shown in FIGS. 6C-6E. FIG. 6C illustrates the top five matching particles after two iterations of the particles. FIG. 6D illustrates the top five matching particles after seven iterations. FIG. 6E illustrates the top five matching particles after ten iterations. The final result after convergence is shown in FIG. 6F.

Figure 7A:
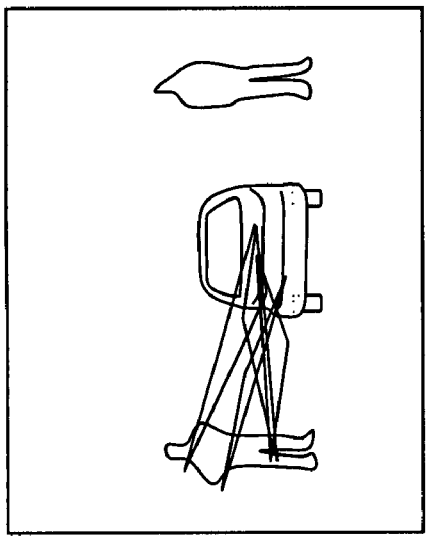
FIG. 7A is an illustration of an exemplary object group where people are on either side of a vehicle.
Figure 7C:
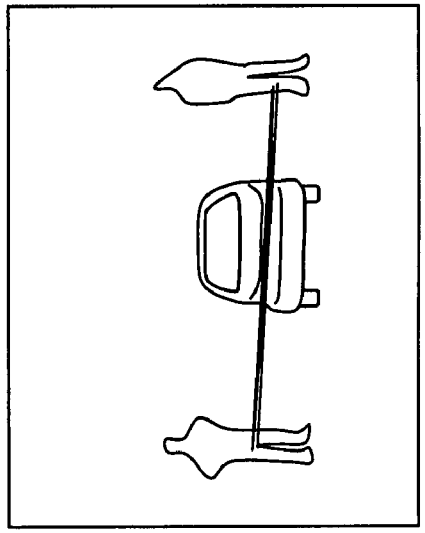
FIG. 7C is an illustration of the top five matching particles after two iterations of the particles.
Figure 7B:
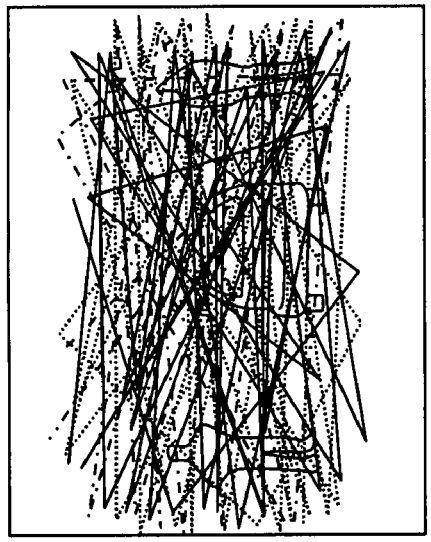
FIG. 7B is an illustration of swarm initialization to detect the object group.
Figure 7E:
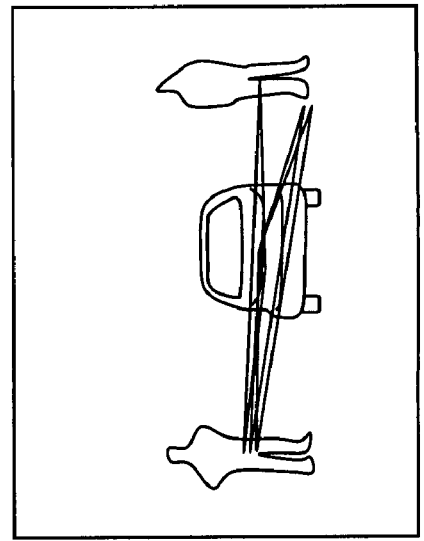
FIG. 7E is an illustration of the top five matching particles after ten iterations of the particles.
Figure 7D:
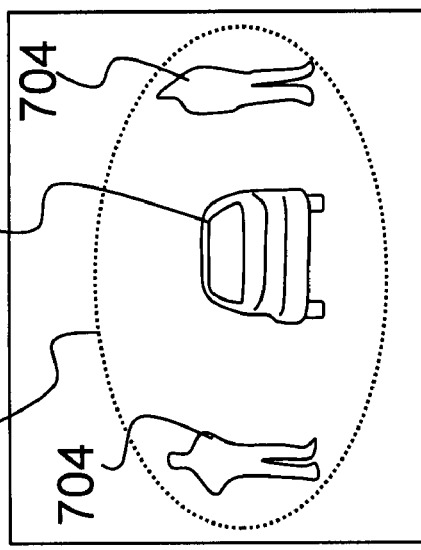
FIG. 7D is an illustration of the top five matching particles after seven iterations of the particles.
Figure 7F:
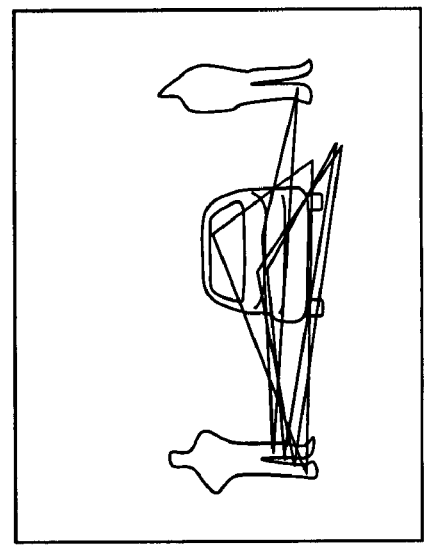
FIG. 7F is an illustration of the top five matching particles after convergence of the particles on the object group.

For further illustration, FIG. 7A illustrates an exemplary image 700 of an object group 702 where people 704 are on either side of a vehicle 706. FIG. 7B illustrates graphical swarm initialization to detect the object group illustrated in FIG. 7A. FIG. 7C illustrates the top five matching particles after two iterations of the particles. FIG. 7D illustrates the top five matching particles after seven iterations. FIG. 7E illustrates the top five matching particles after ten iterations. Finally, FIG. 7F illustrates the top five matching particles after convergence on the object group.

(4.3) Object Recognition System Components

Figure 8:
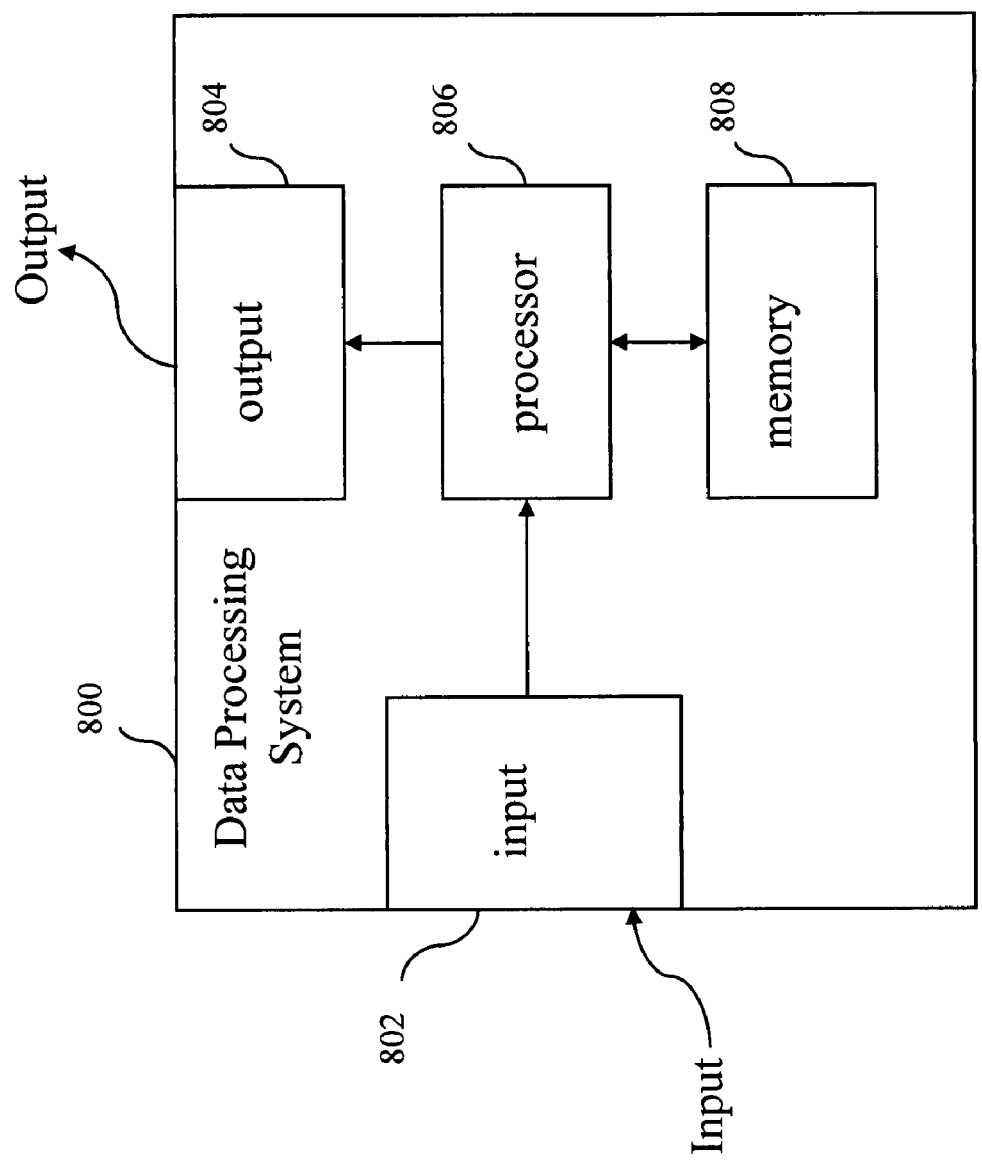
FIG. 8 is a component diagram depicting components of a data process system according to the present invention.

A block diagram depicting the components of object recognition system of the present invention is provided in FIG. 8. The object recognition system 800 comprises an input 802 for receiving information from at least one sensor for use in detecting objects in a scene. Note that the input 802 may include multiple "ports." Typically, input is received from at least one sensor, non-limiting examples of which include video image sensors. An output 804 is connected with the processor for providing information regarding the presence and/or identity of object(s) in the scene to other systems in order that a network of computer systems may serve as an object recognition system. Output may also be provided to other devices or other programs; e.g., to other software modules, for use therein. The input 802 and the output 804 are both coupled with a processor 806, which may be a general-purpose computer processor or a specialized processor designed specifically for use with the present invention. The processor 806 is coupled with a memory 808 to permit storage of data and software to be manipulated by commands to the processor.

(4.4) Computer Program Product

Figure 9:
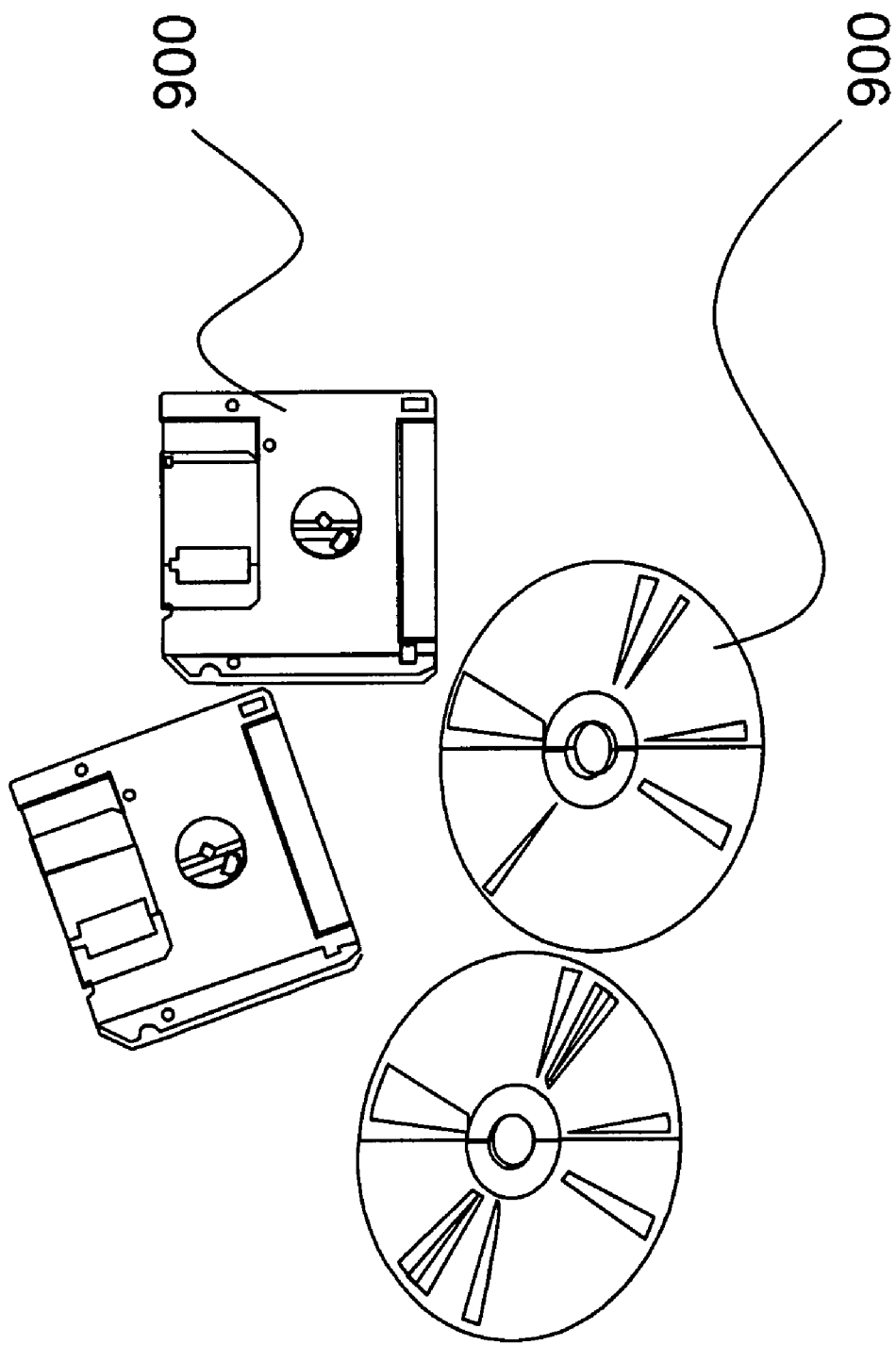
FIG. 9 illustrates a computer program product according to the present invention.

An illustrative diagram of a computer program product embodying the present invention is depicted in FIG. 9. The computer program product 900 is depicted as an optical disk such as a CD or DVD. However, as mentioned previously, the computer program product generally represents computer-readable instructions stored on any compatible computer-readable medium.

What is claimed is:

1. A graph-based object group recognition system incorporating swarming domain classifiers, the system comprising:

A processor having a plurality of software agents configured to operate as a cooperative swarm to classify an object group in a domain, where each agent's position in a multi-dimensional solution space represents a graph having N-nodes, where each node N represents an object in the group having K object attributes, where K>=3, and where each agent is assigned an initial velocity vector to explore a KN-dimensional solution space for solutions matching the agent's graph such that each agent has positional coordinates as it explores the KN-dimensional solution space, where each agent is configured to perform at least one iteration, the iteration being a search in the solution space for an optimum solution where each agent keeps track of its coordinates in the KN-dimensional solution space that are associated with an observed best solution (pbest) that the agent has identified, and a global best solution (gbest) where the gbest is used to store the best solution among all agents which corresponds to a best graph among all agents, with each velocity vector thereafter changing towards pbest and gbest, allowing the cooperative swarm to concentrate on the vicinity of the object group and classify the object group when a classification level exceeds a preset threshold.

2. A graph-based object group recognition system as set forth in claim 1, wherein the processor is further configured to perform operations of:

creating a query graph that corresponds to a user-defined query, the query graph having N-nodes;

representing the query graph as a point in a high-dimensional space solution space, where each of the N-nodes in the query graph provides K-dimensions resulting in the KN-dimensional solution space; and initializing the cooperative swarm in the KN-dimensional solution space such that each agent in the KN-dimensional solution space corresponds to an N-node graph with K degrees of freedom for each node, where each node represents an object, and where the N-node graph that corresponds to an agent's position represents a group of objects, and where a position of the agent in the KN-dimensional solution space defines attributes in the domain of the objects in the group, and where the agents explore the KN-dimensional solution space and converge to a location in the KN-dimensional solution space that corresponds to the graph that best matches the query graph, thereby converging to a location that best matches the user-defined query, whereby by converging to a location that best matches the user-defined query, the agents identify user-defined object groups.

3. A graph-based object group recognition system as set forth in claim 2, wherein the processor is further configured to calculate a fitness function value for a particular agent, where the fitness function value is a graph matching score between the query graph and the graph corresponding to the particular agent.

4. A graph-based object group recognition system as set forth in claim 3, wherein the graphs have node attributes and edge attributes and the processor is further configured to calculate the fitness function value using a fitness function, where the fitness function is a function of compatibilities between the node attributes in the graphs as well as compatibilities between the edge attributes of the graphs, and where the fitness function value is equal to the sum of the compatibilities of the nodes in the query and graph corresponding to a particular agent.

5. A graph-based object group recognition system as set forth in claim 4, wherein the processor is further configured to determine the compatibility between a pair of nodes in the two graphs as a cumulative measure using the actual node compatibilities as well as the compatibilities of all incident edges and the nodes connected to the edges.

6. A graph-based object group recognition system as set forth in claim 5, wherein the cumulative measure is combined using fuzzy aggregation operators to provide a score between 0 and 1 for the fitness function.

7. A graph-based object group recognition system as set forth in claim 6, wherein K equals three such that the KN-dimensional solution space is a 3N-dimensional solution space with the object attributes being spatial attributes x, y, and h, such that x and y are coordinates of an object in the domain and h is the scale of the object in the domain, and wherein the processor is further configured to perform operations of:

representing the query graph as a point in a high-dimensional space solution space, where each of the N-nodes in the query graph provides three-dimensions, resulting in a 3N-dimensional solution space; and initializing the cooperative swarm in the 3N-dimensional solution space such that each agent in the 3N-dimensional solution space corresponds to an N-node graph with three degrees of freedom for each node, where each node represents an object and the degrees of freedom for each node are x, y, and scale, and where the N-node graph that corresponds to an agent's position represents a group of objects with spatial relationships, and where a position of the agent in the 3N-dimensional solution space defines locations and sizes in the domain of the objects in the group, and where the agents explore the 3N-dimensional solution space and converge to a location in the 3N-dimensional solution space that corresponds to the graph that best matches the query graph, thereby converging to a location that best matches the user-defined query;

wherein each agent represents a three-node fuzzy attributed relational graph.

8. A graph-based object group recognition system as set forth in claim 1, wherein the processor is further configured to calculate a fitness function value for a particular agent, where the fitness function value is a graph matching score between the query graph and the graph corresponding to the particular agent.

9. A graph-based object group recognition system as set forth in claim 8, wherein the graphs have node attributes and edge attributes and the processor is further configured to calculate the fitness function value using a fitness function, where the fitness function is a function of compatibilities between the node attributes in the graphs as well as compatibilities between the edge attributes of the graphs, and where the fitness function value is equal to the sum of the compatibilities of the nodes in the query and graph corresponding to a particular agent.

10. A graph-based object group recognition system as set forth in claim 9, wherein the processor is further configured to determine the compatibility between a pair of nodes in the two graphs as a cumulative measure using the actual node compatibilities as well as the compatibilities of all incident edges and the nodes connected to the edges.

11. A graph-based object group recognition system as set forth in claim 10, wherein the cumulative measure is combined using fuzzy aggregation operators to provide a score between 0 and 1 for the fitness function.

12. A graph-based object group recognition system as set forth in claim 1, wherein K equals three such that the KN-dimensional solution space is a 3N-dimensional solution space with the object attributes being spatial attributes x, y, and h, such that x and y are coordinates of an object in the domain and h is the scale of the object in the domain, and wherein the processor is further configured to perform operations of:

representing the query graph as a point in a high-dimensional space solution space, where each of the N-nodes in the query graph provides three-dimensions, resulting in a 3N-dimensional solution space; and initializing the cooperative swarm in the 3N-dimensional solution space such that each agent in the 3N-dimensional solution space corresponds to an N-node graph with three degrees of freedom for each node, where each node represents an object and the degrees of freedom for each node are x, y, and scale, and where the N-node graph that corresponds to an agent's position represents a group of objects with spatial relationships, and where a position of the agent in the 3N-dimensional solution space defines locations and sizes in the domain of the objects in the group, and where the agents explore the 3N-dimensional solution space and converge to a location in the 3N-dimensional solution space that corresponds to the graph that best matches the query graph, thereby converging to a location that best matches the user-defined query.

13. A method for graph-based object group recognition incorporating swarming domain classifiers, the method comprising an act of:

Configuring a plurality of software agents to be initialized by a processor such that when initialized, the software agents cooperate as a cooperative swarm to classify an object group in a domain, where each agent's position in a multi-dimensional solution space represents a graph having N-nodes, where each node N represents an object in the group having K object attributes, where K>=3, and where each agent is assigned an initial velocity vector to explore a KN-dimensional solution space for solutions matching the agent's graph such that each agent has positional coordinates as it explores the KN-dimensional solution space, where each agent is configured to perform at least one iteration, the iteration being a search in the solution space for an optimum solution where each agent keeps track of its coordinates in the KN-dimensional solution space that are associated with an observed best solution (pbest) that the agent has identified, and a global best solution (gbest) where the gbest is used to store the best solution among all agents which corresponds to a best graph among all agents, with each velocity vector thereafter changing towards pbest and gbest, allowing the cooperative swarm to concentrate on the vicinity of the object group and classify the object group when a classification level exceeds a preset threshold.

14. A method as set forth in claim 13, further comprising acts of:

creating a query graph that corresponds to a user-defined query, the query graph having N-nodes;

representing the query graph as a point in a high-dimensional space solution space, where each of the N-nodes in the query graph provides K-dimensions resulting in the KN-dimensional solution space; and initializing the cooperative swarm in the KN-dimensional solution space such that each agent in the KN-dimensional solution space corresponds to an N-node graph with K degrees of freedom for each node, where each node represents an object, and where the N-node graph that corresponds to an agent's position represents a group of objects, and where a position of the agent in the KN-dimensional solution space defines attributes in the domain of the objects in the group, and where the agents explore the KN-dimensional solution space and converge to a location in the KN-dimensional solution space that corresponds to the graph that best matches the query graph, thereby converging to a location that best matches the user-defined query, whereby by converging to a location that best matches the user-defined query, the agents identify user-defined object groups.

15. A method as set forth in claim 14, further comprising an act of calculating a fitness function value for a particular agent, where the fitness function value is a graph matching score between the query graph and the graph corresponding to the particular agent.

16. A method as set forth in claim 15, wherein the graphs have node attributes and edge attributes, and further comprising an act of calculating the fitness function value using a fitness function, where the fitness function is a function of compatibilities between the node attributes in the graphs as well as compatibilities between the edge attributes of the graphs, and where the fitness function value is equal to the sum of the compatibilities of the nodes in the query and graph corresponding to a particular agent.

17. A method as set forth in claim 16, further comprising an act of determining the compatibility between a pair of nodes in the two graphs as a cumulative measure using the actual node compatibilities as well as the compatibilities of all incident edges and the nodes connected to the edges.

18. A method as set forth in claim 17, further comprising an act of combining the cumulative measure using fuzzy aggregation operators to provide a score between 0 and 1 for the fitness function.

19. A method as set forth in claim 18, wherein in the act of configuring the plurality of software agents such that each agent is assigned an initial velocity vector to explore a KN-dimensional solution space, the agents are configured such that K equals three where the KN-dimensional solution space is a 3N-dimensional solution space with the object attributes being spatial attributes x, y, and h, such that x and y are coordinates of an object in the domain and h is the scale of the object in the domain, and further comprising acts of:

representing the query graph as a point in a high-dimensional space solution space, where each of the N-nodes in the query graph provides three-dimensions, resulting in a 3N-dimensional solution space; and initializing the cooperative swarm in the 3N-dimensional solution space such that each agent in the 3N-dimensional solution space corresponds to an N-node graph with three degrees of freedom for each node, where each node represents an object and the degrees of freedom for each node are x, y, and scale, and where the N-node graph that corresponds to an agent's position represents a group of objects with spatial relationships, and where a position of the agent in the 3N-dimensional solution space defines locations and sizes in the domain of the objects in the group, and where the agents explore the 3N-dimensional solution space and converge to a location in the 3N-dimensional solution space that corresponds to the graph that best matches the query graph, thereby converging to a location that best matches the user-defined query;

wherein each agent represents a three-node fuzzy attributed relational graph.

20. A method as set forth in claim 13, further comprising an act of calculating a fitness function value for a particular agent, where the fitness function value is a graph matching score between the query graph and the graph corresponding to the particular agent.

21. A method as set forth in claim 20, wherein the graphs have node attributes and edge attributes, and further comprising an act of calculating the fitness function value using a fitness function, where the fitness function is a function of compatibilities between the node attributes in the graphs as well as compatibilities between the edge attributes of the graphs, and where the fitness function value is equal to the sum of the compatibilities of the nodes in the query and graph corresponding to a particular agent.

22. A method as set forth in claim 21, further comprising an act of determining the compatibility between a pair of nodes in the two graphs as a cumulative measure using the actual node compatibilities as well as the compatibilities of all incident edges and the nodes connected to the edges.

23. A method as set forth in claim 22, further comprising an act of combining the cumulative measure using fuzzy aggregation operators to provide a score between 0 and 1 for the fitness function.

24. A method as set forth in claim 13, wherein in the act of configuring the plurality of software agents such that each agent is assigned an initial velocity vector to explore a KN-dimensional solution space, the agents are configured such that K equals three where the KN-dimensional solution space is a 3N-dimensional solution space with the object attributes being spatial attributes x, y, and h, such that x and y are coordinates of an object in the domain and h is the scale of the object in the domain, and further comprising acts of:
representing the query graph as a point in a high-dimensional space solution space, where each of the N-nodes in the query graph provides three-dimensions, resulting in a 3N-dimensional solution space; and
initializing the cooperative swarm in the 3N-dimensional solution space such that each agent in the 3N-dimensional solution space corresponds to an N-node graph with three degrees of freedom for each node, where each node represents an object and the degrees of freedom for each node are x, y, and scale, and where the N-node graph that corresponds to an agent's position represents a group of objects with spatial relationships, and where a position of the agent in the 3N-dimensional solution space defines locations and sizes in the domain of the objects in the group, and where the agents explore the 3N-dimensional solution space and converge to a location in the 3N-dimensional solution space that corresponds to the graph that best matches the query graph, thereby converging to a location that best matches the user-defined query.

25. A computer program product for graph-based object recognition, the computer program product comprising computer-readable instruction means stored computer-readable medium that are executable by a computer for causing the computer to:
Initialize a plurality of software agents to cooperate as a cooperative swarm to classify an object group in a domain, where each agent's position in a multi-dimensional solution space represents a graph having N-nodes, where each node N represents an object in the group having K object attributes, where K>=3, and where each agent is assigned an initial velocity vector to explore a KN-dimensional solution space for solutions matching the agent's graph such that each agent has positional coordinates as it explores the KN-dimensional solution space, where each agent is configured to perform at least one iteration, the iteration being a search in the solution space for an optimum solution where each agent keeps track of its coordinates in the KN-dimensional solution space that are associated with an observed best solution (pbest) that the agent has identified, and a global best solution (gbest) where the gbest is used to store the best solution among all agents which corresponds to a best graph among all agents, with each velocity vector thereafter changing towards pbest and gbest, allowing the cooperative swarm to concentrate on the vicinity of the object group and classify the object group when a classification level exceeds a preset threshold.

26. A computer program product as set forth in claim 25, further comprising instruction means for causing the computer to perform operations of:
creating a query graph that corresponds to a user-defined query, the query graph having N-nodes;
representing the query graph as a point in a high-dimensional space solution space, where each of the N-nodes in the query graph provides K-dimensions resulting in the KN-dimensional solution space; and
initializing the cooperative swarm in the KN-dimensional solution space such that each agent in the KN-dimensional solution space corresponds to an N-node graph with K degrees of freedom for each node, where each node represents an object, and where the N-node graph that corresponds to an agent's position represents a group of objects, and where a position of the agent in the KN-dimensional solution space defines attributes in the domain of the objects in the group, and where the agents explore the KN-dimensional solution space and converge to a location in the KN-dimensional solution space that corresponds to the graph that best matches the query graph, thereby converging to a location that best matches the user-defined query, whereby by converging to a location that best matches the user-defined query, the agents identify user-defined object groups.

27. A computer program product as set forth in claim 26, further comprising instruction means for causing a computer to perform an operation of calculating a fitness function value for a particular agent, where the fitness function value is a graph matching score between the query graph and the graph corresponding to the particular agent.

28. A computer program product as set forth in claim 27, wherein the graphs have node attributes and edge attributes, and wherein the computer program product further comprises instruction means for causing a computer to perform an operation of calculating the fitness function value using a fitness function, where the fitness function is a function of compatibilities between the node attributes in the graphs as well as compatibilities between the edge attributes of the graphs, and where the fitness function value is equal to the sum of the compatibilities of the nodes in the query and graph corresponding to a particular agent.

29. A computer program product as set forth in claim 28, further comprising instruction means for causing a computer to perform an operation of determining the compatibility between a pair of nodes in the two graphs as a cumulative measure using the actual node compatibilities as well as the compatibilities of all incident edges and the nodes connected to the edges.

30. A computer program product as set forth in claim 29, further comprising instruction means for causing a computer to perform an operation of combining the cumulative measure using fuzzy aggregation operators to provide a score between 0 and 1 for the fitness function.

31. A computer program product as set forth in claim 30, further comprising instruction means for causing a computer to perform operations of:
representing the query graph as a point in a high-dimensional space solution space, where each of the N-nodes in the query graph provides three-dimensions, resulting in a 3N-dimensional solution space; and
initializing the cooperative swarm in the 3N-dimensional solution space such that each agent in the 3N-dimensional solution space corresponds to an N-node graph with three degrees of freedom for each node, where each node represents an object and the degrees of freedom for each node are x, y, and scale, and where the N-node graph that corresponds to an agent's position represents a group of objects with spatial relationships, and where a position of the agent in the 3N-dimensional solution space defines locations and sizes in the domain of the objects in the group, and where the agents explore the 3N-dimensional solution space and converge to a location in the 3N-dimensional solution space that corresponds to the graph that best matches the query graph, thereby converging to a location that best matches the user-defined query;

wherein each agent represents a three-node fuzzy attributed relational graph.

32. A computer program product as set forth in claim 25, further comprising instruction means for causing a computer to perform an operation of calculating a fitness function value for a particular agent, where the fitness function value is a graph matching score between the query graph and the graph corresponding to the particular agent.

33. A computer program product as set forth in claim 32, wherein the graphs have node attributes and edge attributes, and wherein the computer program product further comprises instruction means for causing a computer to perform an operation of calculating the fitness function value using a fitness function, where the fitness function is a function of compatibilities between the node attributes in the graphs as well as compatibilities between the edge attributes of the graphs, and where the fitness function value is equal to the sum of the compatibilities of the nodes in the query and graph corresponding to a particular agent.

34. A computer program product as set forth in claim 33, further comprising instruction means for causing a computer to perform an operation of determining the compatibility between a pair of nodes in the two graphs as a cumulative measure using the actual node compatibilities as well as the compatibilities of all incident edges and the nodes connected to the edges.

35. A computer program product as set forth in claim 34, further comprising instruction means for causing a computer to perform an operation of combining the cumulative measure using fuzzy aggregation operators to provide a score between 0 and 1 for the fitness function.

36. A computer program product as set forth in claim 25, further comprising instruction means for causing a computer to perform operations of:

representing the query graph as a point in a high-dimensional space solution space, where each of the N-nodes in the query graph provides three-dimensions, resulting in a 3N-dimensional solution space; and initializing the cooperative swarm in the 3N-dimensional solution space such that each agent in the 3N-dimensional solution space corresponds to an N-node graph with three degrees of freedom for each node, where each node represents an object and the degrees of freedom for each node are x, y, and scale, and where the N-node graph that corresponds to an agent's position represents a group of objects with spatial relationships, and where a position of the agent in the 3N-dimensional solution space defines locations and sizes in the domain of the objects in the group, and where the agents explore the 3N-dimensional solution space and converge to a location in the 3N-dimensional solution space that corresponds to the graph that best matches the query graph, thereby converging to a location that best matches the user-defined query.

\* \* \* \* \*